(12) United States Patent
Lyons et al.

(10) Patent No.: US 7,529,218 B2
(45) Date of Patent: May 5, 2009

(54) HIGH DENSITY WLAN SYSTEM

(75) Inventors: Daniel Lyons, Chippewa, OH (US); David Petsko, Akron, OH (US); Donald I. Sloan, Stow, OH (US); James Jay Friedmann, Canton, OH (US); James A. Amos, North Canton, OH (US); Fred J. Anderson, Lakeville, OH (US)

(73) Assignee: Cisco Technology, Inc.

( * ) Notice: Subject to any disclaimer, the term of this patent is extended or adjusted under 35 U.S.C. 154(b) by 854 days.

(21) Appl. No.: 10/977,284

(22) Filed: Oct. 29, 2004

(65) Prior Publication Data
US 2006/0092889 A1 May 4, 2006

Related U.S. Application Data

(60) Provisional application No. 60/604,269, filed on Aug. 25, 2004.

(51) Int. Cl.
*H04W 52/00* (2009.01)
*H04B 7/00* (2006.01)
(52) U.S. Cl. .................. 370/338; 455/421; 455/115.3; 455/226.2; 455/513
(58) Field of Classification Search ............... 370/338, 370/445
See application file for complete search history.

(56) References Cited

U.S. PATENT DOCUMENTS

| | | | |
|---|---|---|---|
| 5,241,685 A | | 8/1993 | Bodin et al. |
| 5,594,731 A | * | 1/1997 | Reissner ................ 370/338 |
| 6,052,408 A | * | 4/2000 | Trompower et al. ......... 375/141 |
| 6,067,291 A | * | 5/2000 | Kamerman et al. ......... 370/338 |
| 6,438,379 B1 | * | 8/2002 | Gitlin et al. ................ 455/449 |
| 6,496,696 B1 | | 12/2002 | Melnik |
| 6,631,116 B1 | * | 10/2003 | Eneroth et al. ............. 370/236.2 |
| 6,952,589 B1 | * | 10/2005 | Mantha ................ 455/501 |
| 7,206,840 B2 | * | 4/2007 | Choi et al. ................ 709/225 |
| 7,274,945 B2 | * | 9/2007 | Backes et al. ............... 455/510 |
| 2001/0028639 A1 | | 10/2001 | Eikelenboom et al. |
| 2003/0056074 A1 | * | 3/2003 | Hansen ................ 711/172 |
| 2003/0171115 A1 | | 9/2003 | Batra et al. |
| 2004/0047324 A1 | * | 3/2004 | Diener ................ 370/338 |
| 2004/0137908 A1 | * | 7/2004 | Sinivaara et al. ......... 455/452.1 |
| 2004/0224637 A1 | * | 11/2004 | Silva et al. ................ 455/63.4 |
| 2005/0058151 A1 | * | 3/2005 | Yeh ................ 370/445 |
| 2006/0264229 A1 | * | 11/2006 | Guo et al. ................ 455/522 |
| 2008/0037439 A1 | * | 2/2008 | Cave et al. ................ 370/252 |

* cited by examiner

*Primary Examiner*—Chi H Pham
*Assistant Examiner*—Ahmed Elallam
(74) *Attorney, Agent, or Firm*—Tucker Ellis & West LLP

(57) ABSTRACT

A method for controlling cell size associated with an access point that has a receive sensitivity and an output power. The method includes changing a start of packet threshold and/or a clear channel assessment threshold to vary the cell size of the access point.

26 Claims, 8 Drawing Sheets

HIGH DENSITY WLAN SYSTEM

CROSS REFERENCE TO RELATED APPLICATIONS

This application claims the benefit of priority of U.S. Provisional Application No. 60/604,269 filed Aug. 25, 2004.

BACKGROUND OF THE INVENTION

The present invention relates generally to wireless networks and more particularly to a system and method for a high density wireless local area network.

The popularity of wireless devices is leading to increased user density within wireless local area networks operating in accordance with the Institute of Electrical and Electronics Engineers (IEEE) 802.11a/b/g standards. However, as more users are added to a given network, the available throughput per user decreases. This is due to the fact that all of the communicated data passes through access points comprising the network, and each access point is limited in data throughput capability.

One approach to increasing throughput, thereby providing for additional users, is to add more access points to the network. This approach is valid provided there are enough carrier frequencies for all of the access points to operate on a different frequency. However, this approach fails when there are no longer any unused carrier frequencies available and carrier frequencies are reused.

For example, if an access point is added on a carrier frequency that is already assigned to another access point, two "cells" operating on the same frequency results. As used herein, the term "cell" describes a single access point and the client devices associated with that access point. Moreover, the additional access point provides no additional throughput if the two cells are in close proximity and the respective service areas of the two access points overlap. No additional throughput results because the carrier sense multiple access (CSMA) mechanism typically used to mitigate interference for IEEE 802.11 products prevents the two co-channel access points from operating simultaneously.

Despite the carrier sense multiple access mechanism preventing the two co-channel access points from operating simultaneously, in many instances there is adequate signal-to-interference ratio (SIR) to allow simultaneous transmission. As used herein, the signal-to-interference ratio is the ratio of the intended signal power to the total interference signal power originating from other cells. Therefore, it is often desirable to reduce the service areas of access points such that the service areas of co-channel access points do not overlap, thereby increasing throughput.

One approach to reducing the service area of an access point is to reduce or limit the output power of the access point. This approach addresses the problem of overlapping service areas, but also decreases client received signal strength within the service area rates and consequently decreases the signal to noise ratio. Furthermore, since higher data rates require higher received signal strength than lower data rates, the usable range for higher data rates is less than the usable range for lower data rates. Therefore, reducing the output power of access points such that services areas of the cells do not overlap allows co-channel cells to simultaneously transmit, but also reduces the range for higher data rates within the intended service areas. Therefore, controlling cell size by reducing output power also results in limited throughput, resulting in breaches in the total coverage area, e.g., between the access points, for the higher data rates.

Thus, there exists a need for a system and method for a high density wireless local area network that controls cell size in a way that allows multiple cells on the same carrier frequency to transmit simultaneously, but without reducing the transmit power, thereby preserving the range capability of the higher data rates.

SUMMARY OF THE INVENTION

The present invention provides a system and method for a high density wireless local area network that controls cell size in a way that allows multiple cells on the same carrier frequency to transmit simultaneously, but without reducing the transmit power, thereby preserving the range capability of the higher data rates. More particularly, the present invention controls cell size by varying start of packet (SOP) and/or clear channel assessment (CCA) thresholds.

In accordance with an aspect of the present invention, the threshold signal strength for receiving a packet, e.g., SOP, is varied to increase or decrease the cell size. In accordance with an aspect of the present invention, the threshold for sending a transmission, e.g., CCA, is varied to increase or decrease the cell size.

In accordance with the present invention there is disclosed herein a method for controlling cell size associated with an access point having a receive sensitivity and an output power. The method includes changing at least one of a start of packet threshold and a clear channel assessment threshold to vary the cell size of the access point.

Further in accordance with the present invention there is disclosed herein a method for operating a high density wireless local area network. The method includes assigning multiple access points having receive sensitivities and output powers to the same carrier frequency and controlling cell sizes associated with the access points by changing at least one of a start of packet threshold and a clear channel assessment threshold to vary the cell sizes of the access points.

Still further in accordance with the present invention there is disclosed herein an access point configured to implement a methodology of the present invention. The access point comprises a transceiver configured for engaging in wireless communications with clients and a controller a controller coupled to the transceiver and configured to control the operation of the transceiver when engaging in wireless communications with the clients. The transceiver includes a transmitter having an output power and a receiver having a receive sensitivity, while the controller includes a processor configured for executing program code and a memory configured for storing the program code and a start of packet threshold or a clear channel assessment threshold. The start of packet threshold or the clear channel assessment threshold is varied to control the cell size of the access point.

Yet further in accordance with the present invention there is disclosed herein a high density wireless local area network. The network includes a first access point and second access points assigned to the same carrier frequency. Each access point includes a transmitter having an output power, a receiver having a receive sensitivity, a processor configured for executing program code to control the operation of the transmitter and the receiver when engaging in wireless communications with clients, and a memory configured for storing the program code and a start of packet threshold or a clear channel assessment threshold. Cell sizes associated with the first and second access points are controlled by changing at least the start of packet thresholds or the clear channel assessment thresholds to vary the cells sizes of the access points.

By virtue of the foregoing, there is thus provided a system and method for a high density wireless local area network that controls cell size in a way that allows multiple cells on the same carrier frequency to transmit simultaneously, but without reducing the transmit power, thereby preserving the range capability of the higher data rates.

These and other objects and advantages of the present invention will become readily apparent to those skilled in this art from the following description wherein there is shown and described a preferred embodiment of this invention, simply by way of illustration of one of the best modes suited to carry out the invention. As it will be realized, the invention is capable of other different embodiments and its several details are capable of modifications in various obvious aspects all without departing from the spirit of the present invention. Accordingly, the drawings and descriptions will be regarded as illustrative in nature and not as restrictive.

BRIEF DESCRIPTION OF THE DRAWINGS

The accompanying drawings, which are incorporated in and constitute a part of this specification, illustrate embodiments of the present invention and, together with a general description of the invention given above, and the detailed description given below, serve to explain the principles of the present invention.

DETAILED DESCRIPTION OF THE DRAWINGS

Figure 1:
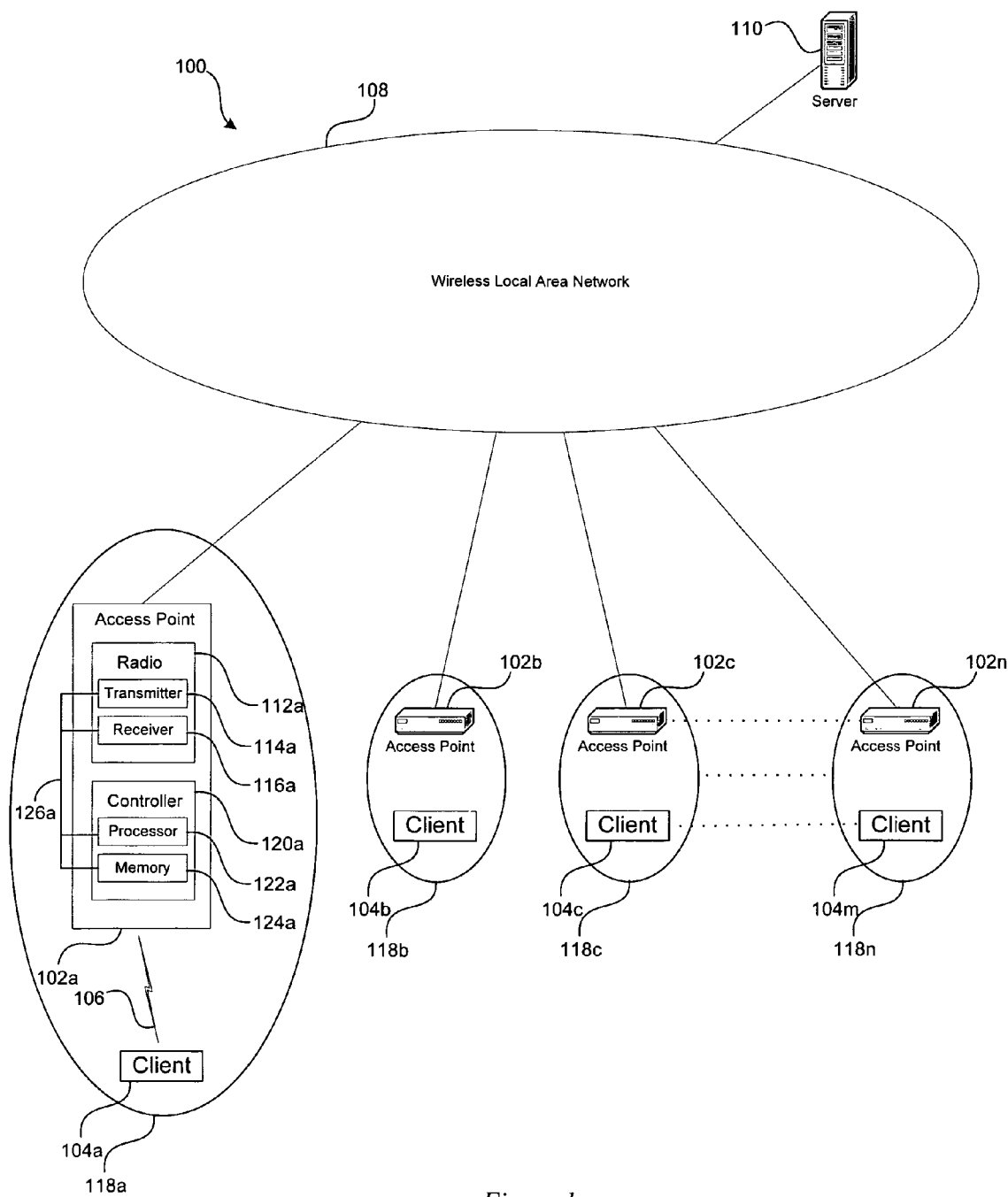
FIG. 1 is a block diagram of a wireless local area network including a number of access points in accordance with principles of the present invention.

With reference to FIG. 1, one embodiment 100 of a wireless network in accordance with principles of the present invention is shown. For example, wireless local area network 100 operates in accordance with one or more of the Institute of Electrical and Electronics Engineers (IEEE) 802.11a/b/g standards in any one of a number of designated frequency bands using a number of similarly designated carrier frequencies or channels. Such carrier frequencies or channels are typically limited in number, for example, numbering as few as three and as many as twenty-three in the United States of America.

Wireless local area network 100 is defined by a plurality of access points 102a-n, access point 102a being shown in block diagram form, where "n" is an integer greater than one and denotes any practical number of access points. The carrier frequencies are generally assigned to the access points 102a-n for use in wireless data communications. However, as the number of access points 102a-n is often greater than the number of carrier frequencies afford by the standards, carrier frequencies or channels are reused, resulting in multiple access points operating on the same channel or co-channel access points.

More specifically, the access points 102a-n are configured to engage in wireless data communications, an exemplary communication link being shown at reference numeral 106, with a number of wireless devices designated as clients 104a-m, where "m" as shown is an integer greater than one and denotes any number of clients, and n and m can be equal or unequal. The popularity of these wireless devices leads to increased user density within the wireless local area network 100 as more clients 104a-m are added to the wireless local area network 100.

The access points 102a-n are placed in communication via a fixed backbone network 108. Access points 102a-n define cells 118a-n respectively, not drawn to scale. The operations of access points 102a-n are, in part, controlled by a server 110, also placed in communication with the access points 102a-n via the fixed backbone network 108. Each of the access points 102a-n generally include a transceiver 112a for engaging in wireless data communications with the clients 104a-m. More specifically, each transceiver 112a comprises a transmitter 114a for transmitting data to and a receiver 116a for receiving data from the clients 104a-m. The operation of transceiver 112a is controlled by a controller 120a. Controller 120a comprises a processor 122a, e.g., a central processing unit such as a microprocessor, and a memory 124a. Memory 124a suitably comprises at least one of read only memory (e.g., a non-volatile memory such as a ROM, CD ROM, EEPROM) and volatile memory such as random access memory. Program code and configurable operating parameters (e.g., SOP, CCA) for controlling the operation of processor 122a are stored in memory 124a or other computer-readable medium. Data path 126a is employed for transferring data between processor 122a, memory 124a, transmitter 114a and receiver 114a. Data path 126a is at least one of a wired and wired communication link suitable for transferring data between the aforementioned components.

The term "computer-readable medium" as used herein refers to any medium that participates in providing instructions to processor 122a for execution. Such a medium may take many forms, including but not limited to non-volatile media and volatile media. Non-volatile media include for example optical or magnetic disks. Volatile media include dynamic memory such as main memory 122a. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, or any other medium from which a computer can read.

Wireless data communications between the access points 102a-n and the clients 104a-m occur at a variety of different data rates, such as, for example, 6, 9, 12, 18, 24, 36, 48, and 54 Megabits per second (Mbps), as necessitated by the applications used by the clients 104a-m and the capabilities of the access points 102a-n. Thus, from time to time, the clients 104a-m and the access points 102a-n engage in high data rate communications, e.g., 54 Megabits per second, and low data rate communications, e.g., 6 Megabits per second. As will be appreciated by the skilled artisan, higher data rates require higher received signal strength than lower data rates. Thus, the usable range for higher data rates is less than the usable range for lower data rates. The usable range for various data rates with respect to cell size will be described in more detail hereinafter.

To mitigate interfere between the cells 118a-o, the access points 102a-m include a carrier sense multiple access (CSMA) mechanism for performing clear channel assessment. To this end, each of the access points further includes a controller 120a for controlling the operation of transceiver 112a when engaging in wireless data communications with the clients 104a-m. More specifically, each controller 120a comprises a processor 122a and a memory 124a. Processor 122a is configured for executing program code stored in memory 124a, while memory 124a also stores thresholds as will now be described.

The start of packet (SOP) threshold denotes a limit that the receiver 116a uses to decide if a particular data packet should be received or not. For example, the receiver 116a will demodulate a packet if the signal strength of the packet is at or above the start of packet threshold and will ignore the packet otherwise. Similarly, the clear channel assessment (CCA) threshold denotes a limit that controls when the transmitter 114a transmits. For example, if the access point 102a wishes to transmit, the transceiver 112a uses the receiver 116a to monitor a respective channel to determine if there is any signal energy above the clear channel assessment threshold. The transmitter 114a transmits if the signal energy is below the clear channel assessment threshold, and refrains from transmitting otherwise. Thus, the start of packet and clear channel assessment thresholds can be controlled separately.

The start of packet and clear channel assessment thresholds are set to initial values. However, in accordance with principles of the present invention, and as will be described in more detail hereinafter, the start of packet threshold and/or the clear channel assessment threshold are varied to control cell size in a way that allows multiple cells on the same carrier frequency to transmit simultaneously, without reducing or otherwise changing the transmit power, thereby maintaining the signal to noise ratio and signal to interference ratio, preserving the range capability for higher data rates.

Figure 2:
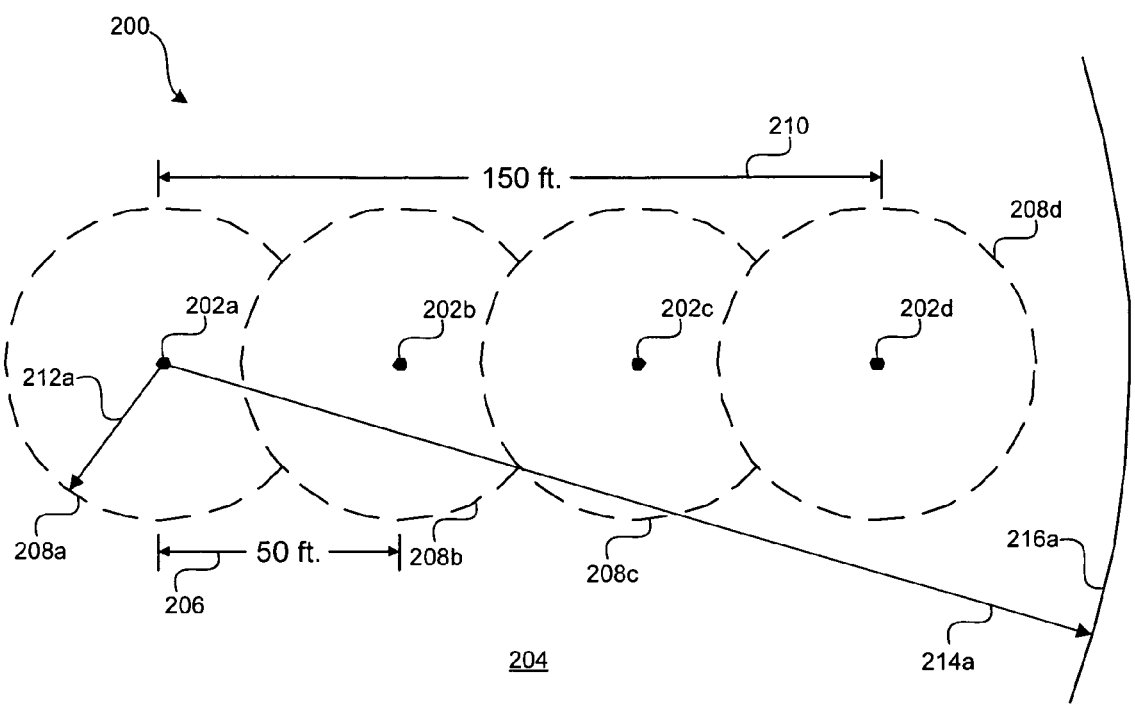
FIG. 2 is an illustration of a scenario for a wireless network including four access points with three available frequencies.

For purposes and ease of illustration, FIG. 2 shows a scenario 200 where four access points 202a-d having four respective intended service areas 208a-d (shown in dashed line) are deployed to cover an area 204, but there are only three carrier frequencies or channels, denoted as $F_1$-$F_3$, available for use. Because there are only three frequencies $F_1$-$F_3$ available for use, two of the access points, e.g., access points 202a and 202d, are assigned or operate on the same carrier frequency or channel $F_1$.

Furthermore, suppose that the desired throughput per user requires an access point every fifty feet as generally indicated at reference numeral 206. Thus, in this scenario 200, the co-channel access points 202a and 202d are separated by one hundred fifty feet as indicated at reference numeral 210. Although the intended service area radius for each access point is approximately fifty feet, as indicated at reference numeral 212a, the typical range of an 802.11 wireless local area network transceiver, e.g., transceiver 112a shown in FIG. 1, is on the order of several hundred feet or more for lower data rates, as indicated at reference numeral 214a. Therefore, the actual service area 216a of access point 202a encompasses the intended service area 208d of access point 202d. Similarly, the actual service area (not shown) of access point 202d encompasses the intended service area 208a of access point 202a. In addition, if the start of packet and clear channel assessment thresholds are set to initial receive sensitivities of the transceivers, as defined by the receivers, and used by the carrier sense multiple access mechanisms within the access points 202a, 202d, only one of the two access points can be active at a given time and the combined throughput for both access points will be no greater than the maximum throughput of a single access point.

However, if the start of packet threshold and/or the clear channel assessment threshold are changed and/or varied in accordance with principles of the present invention, both of the access points 202a, 202d can be active at a given time and the combined throughput for both access points will be greater than the maximum throughput of a single access point, e.g., twice that of a single access point. Moreover, the intended service areas 208a-d of the access points 202a-d can be realized.

Figure 3:
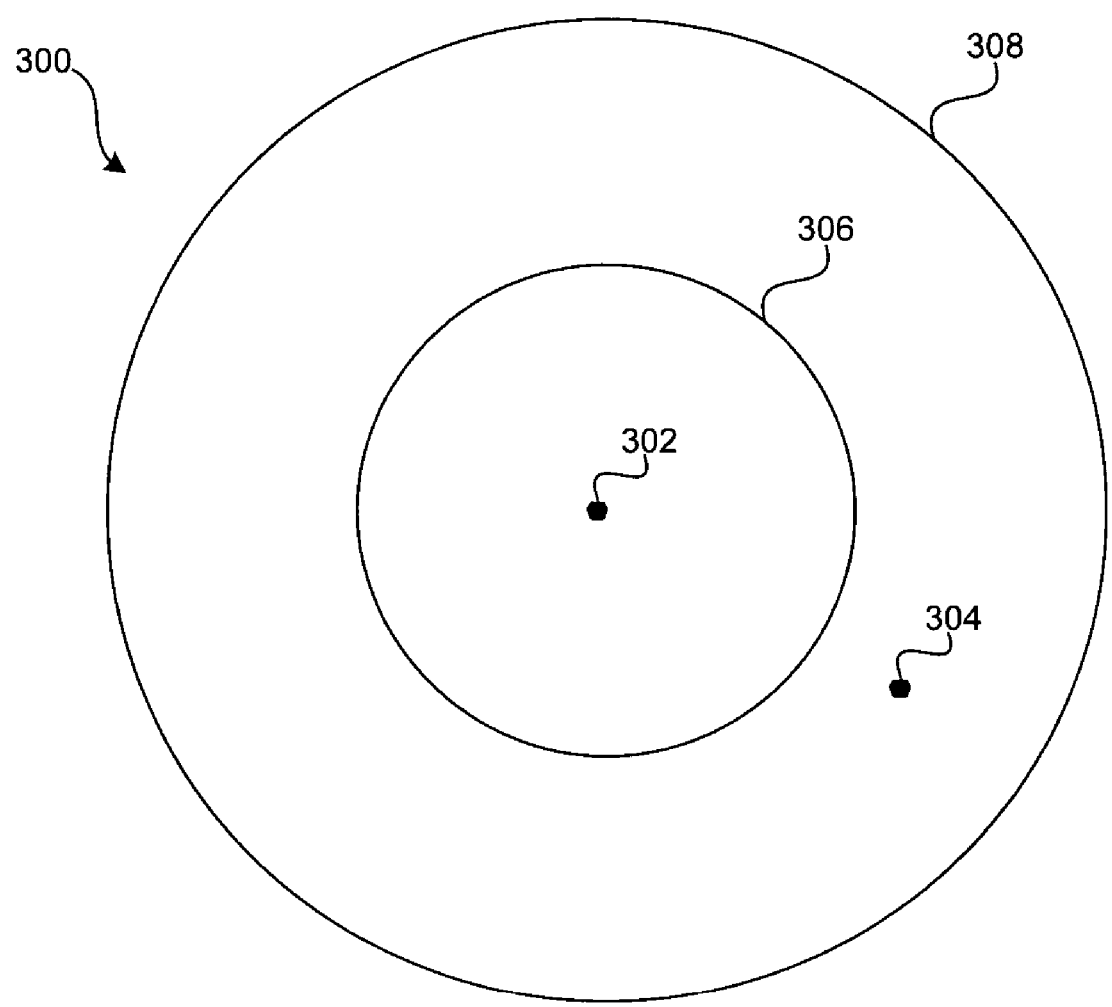
FIG. 3 is an illustration of how start of packet and clear channel assessment thresholds control cell size.

FIG. 3 shows how varying the start of packet and clear channel assessment thresholds is used to control cell size. Generally, cell 300 is defined by access point 302 and client 304. As shown, cell 300 has a first service area 306 and a second service area 308. The first service area 306 has increased SOP and CCA thresholds when compared to the second service area 308. Thus, because the first service area 306 has a higher the start of packet and clear channel assessment thresholds, access point 302 ignores signals from client 304, as client 304 is outside the service area 306. Conversely, because service area 308 has lower start of packet and clear channel assessment thresholds, access point 302 processes signals from client 304, as client 304 is inside the service area 308. Thus, raising and lowering the start of packet and clear channel assessment thresholds can be used to control cell size.

Figure 4:
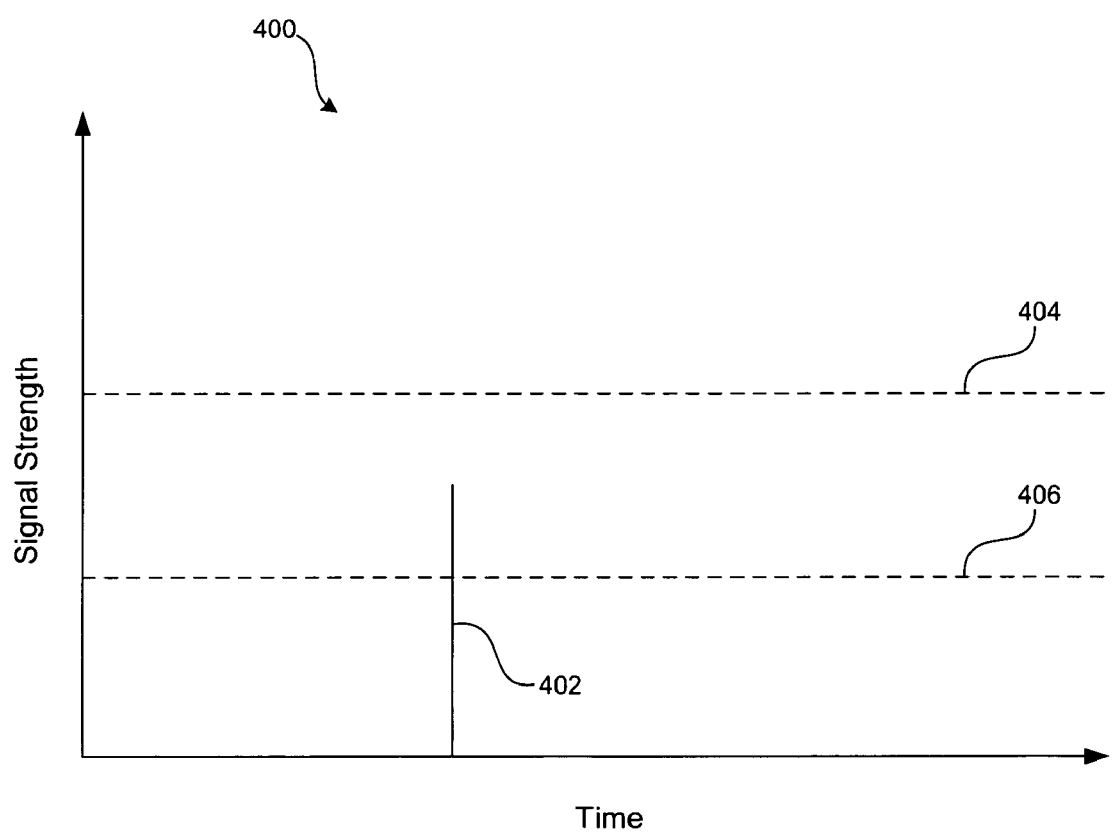
FIG. 4 is a graph showing the relationship between start of packet and clear channel assessment thresholds and client signal strength.

FIG. 4 shows a graph 400 illustrating the relationship between start of packet and clear channel assessment thresholds and client signal strength. As shown, the x-axis, or ordinate, generally indicates time, while the y-axis, or abscissa, indicates signal strength. A client signal strength is indicated at reference numeral 402. As indicated at reference numeral 404, if the start of packet and clear channel assessment thresholds are set higher than the client signal strength of client signal 402, therefore the client will be ignored, and packets from the client will not be received and demodulated by the access point, and the access point will transmit regardless of whether the client is transmitting. Conversely, and as indicated at reference numeral 406, if the start of packet and clear channel assessment thresholds are set lower than the client signal strength 402, the client prevents assessment of a clear channel, and the client will not transmit. Furthermore, packets from the client will be received and demodulated by the access point.

Figure 5:
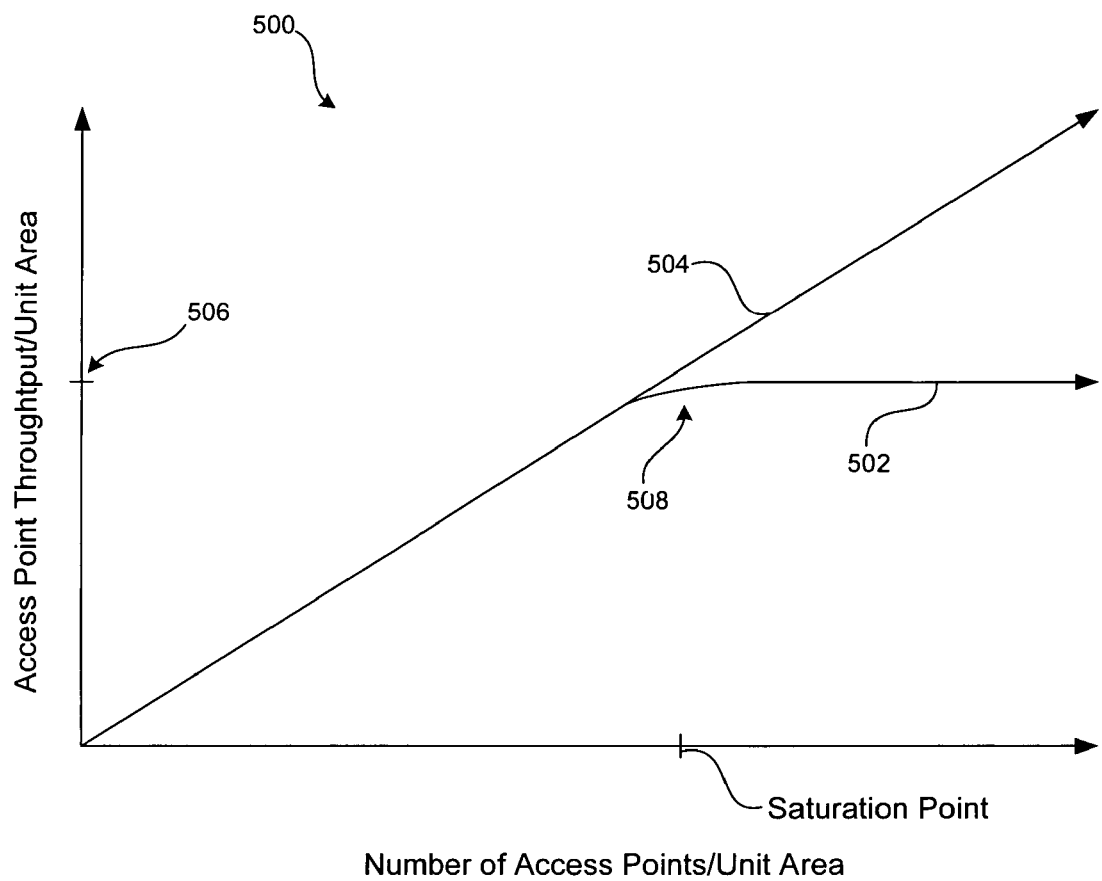
FIG. 5 is a graph showing the divergence of throughput density when the start of packet and clear channel assessment thresholds are set to the minimum receive sensitivity from ideal throughput density as access point density increases.

FIG. 5 shows a graph 500 illustrating the divergence of throughput density with the start of packet and clear channel assessment thresholds are set to the minimum receive sensitivities of the transceivers, as defined by the receivers, and used by the carrier sense multiple access mechanisms within the access points from ideal throughput density as the access point density increases. As shown, the x-axis, or ordinate, generally indicates the number of access points per unit area, while the y-axis, or abscissa, indicates the access point throughput per unit area. More specifically, curve 502 illustrates the throughput density when the start of packet and clear channel assessment thresholds are set to the minimum receive sensitivities of the transceivers and used by the carrier sense multiple access mechanisms within the access points as the access point density increases. It will be appreciated by the skilled artisan that after a certain saturation point 508, adding additional access points without changing cell sizes does not increase throughput. In contrast, line 504 illustrates the ideal throughput density as the access point density increases. In other words, line 504 illustrates the desired increase in throughput as additional access points are added to a wireless network.

Thus, for a given geographic area, there is an ideal upper limit, as indicated at reference numeral 506, on the throughput density, e.g., throughput per unit area. Furthermore, once the access point density, i.e., the number of access points per unit area, reaches the saturation point, as indicated at reference numeral 508, where the service areas of co-channel access points begin to overlap, as was illustrated in FIG. 2, the available throughput density can not be increased further as indicated by curve 502 using prior art methods.

However, if the start of packet threshold and/or the clear channel assessment threshold are raised and/or set in accordance with principles of the present invention, an approximation of the ideal, i.e., throughput density increasing as the access point density increases, line 504, is achieved.

One factor to be taken into consideration as more access points are added to the network or the access point density is increased is the signal-to-interference ratio (SIR). As used herein, the signal-to-interference ratio is the ratio of the intended signal power to the total interference signal power originating from other cells. For example, in a typical wireless local network, the carrier sense multiple access mechanism with start of packet and clear channel assessment thresholds set to the minimum receive sensitivity attempts to ensure there is always adequate signal-to-interference ratio by allowing only one radio to transmit on a particular carrier frequency or channel at a time. However, as was shown in FIG. 5, this leads to an upper limit 506 on the achievable throughput density.

In contrast, when the carrier sense multiple access mechanisms are all disabled and all of the access points are allowed to transmit without monitoring the activity from other access points, the signal-to-interference ratio depends on the environment that the access points are placed in and the frequency reuse pattern applied thereto. Simulations have demonstrated that there would be adequate signal-to-interference to allow simultaneous and reliable data transfer in multiple co-channel cells, even where all access points transmit simultaneously. For example, this is especially true for Institute of Electrical and Electronics Engineers 802.11a where the new frequency allocations provide for in Federal Communications Commissions (FCC) Report and Order 03-287 increases the number of available carrier frequencies or channels from twelve to twenty-three in the United States. Other simulations, have shown that the signal-to-interference ratio resulting from simultaneous transmissions from all access points in a wireless local area network will likely only restrict data transfers to 36 megabits per second (Mbps) for each access point. Therefore, it has been determined that reducing the service areas of access points in a wireless network to allow simultaneous transmission by co-channel access points is a means of increasing throughput within the network.

One approach to reducing the service area of access points is to reduce the output power of the access points. Although reducing the output power prevents co-channel access points from "hearing" or interfering with one another, reducing the output power also decreases the received signal strength and signal to noise ration within the respective service areas of the access points as will be shown. Moreover, because higher data rates require higher received signal strength than the lower data rates, the usable range of the higher data rates is less than the usable range of the lower data rates as will also be shown.

Figure 6:
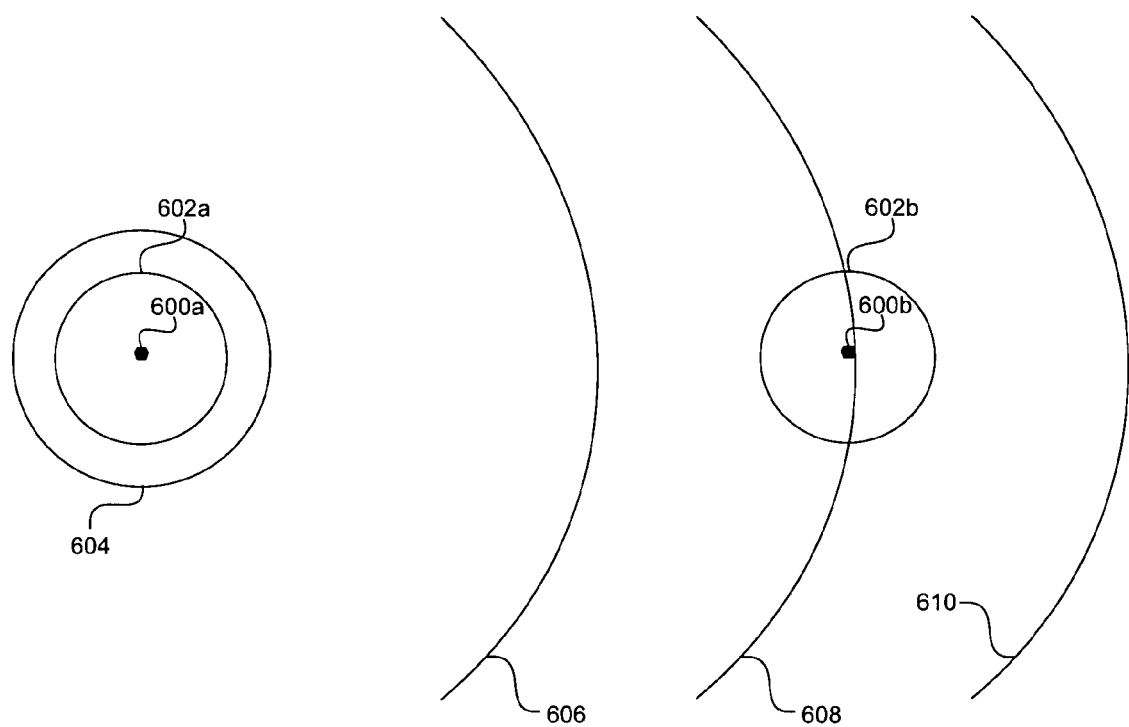
FIG. 6 is a graphical depiction of access point ranges for various data rates for an access point operated at nominal power.

For example, FIG. 6 shows a graphical depiction of access point ranges for various data rates for an access point operated at nominal power. More specifically, FIG. 6 shows the range of access point 400*a* for data rates of 54, 24, 12 and 6 Megabits per second, as indicated at reference numerals 604, 606, 608, and 610, respectively. As shown, the 54 Megabit per second range 604 of access point 600*a* extends just beyond an intended service area, indicated at reference numeral 602*a*. Similarly, the 24 Megabit per second range 606 extends beyond the 54 Megabit per second range 604. Extending beyond the 54 and 24 Megabit per second ranges 604, 606, the 12 and 6 Megabit per second ranges 608, 610 encompasses part or all of the intended coverage area 602*b* of access point 600*b*.

Figure 7:
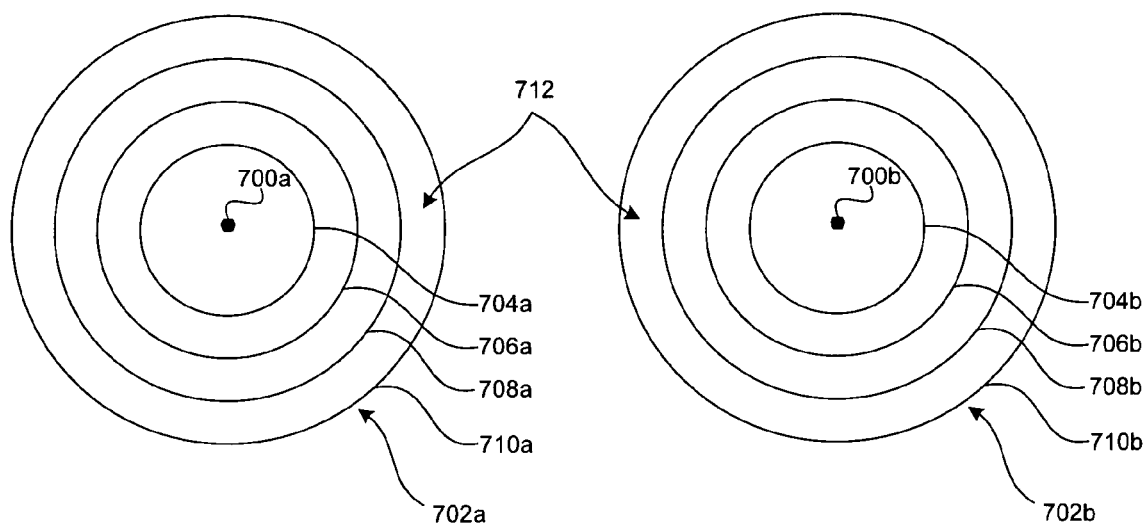
FIG. 7 is a graphical depiction of controlling cell size by reducing output power.

FIG. 7 shows a graphical depiction of controlling cell size by reducing output power, i.e., decreasing the output power of two co-channel access points 700*a*, 700*b* from their nominal output powers. Data rates of 54, 24, 12 and 6 Megabits per second are again used for example. Data rates of 54, 24, 12 and 6 Megabits per second, are indicated at reference numerals 704*a*, 706*a*, 708*a*, and 710*a* for access point 700*a* and 704*b*, 706*b*, 708*b*, and 710*b* for access points 700*b*, respectively. More specifically, the output powers of the access points are reduced such that the 6 Megabit per second ranges 710*a*, 710*b* do not extend beyond the intended service area as indicated at reference numerals 702*a*, 702*b*, respectively. Thus, the two co-channel access points 702*a*, 702*b* can transmit simultaneously without interfering with each other, thereby increasing throughput. However, as will be appreciated by those of ordinary skill in the art, the useable data rate within each intended service area 702*a*, 702*b* has been significantly reduced. For example, a data rate of 54 Megabits per second 704*a*, 704*b* is not available throughout much of the intended service areas 702*a*, 702*b*. Therefore, controlling cell size by reducing output power results in limited throughput as there are generally breaches in the total coverage area for the higher data rates as generally indicated by reference numeral 712.

Figure 8:
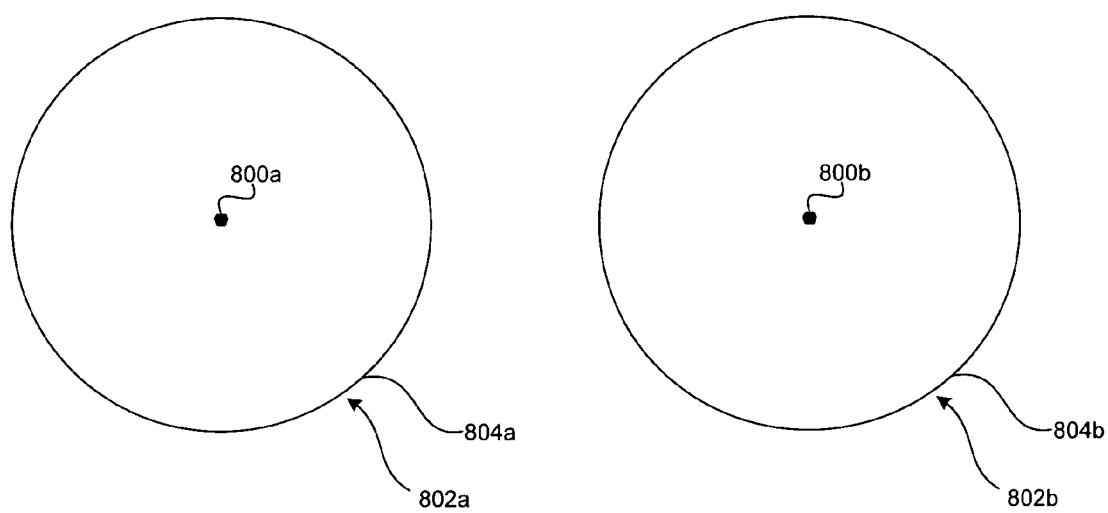
FIG. 8 is a graphical depiction of controlling cell size by increasing and/or setting the start of packet and/or the clear channel assessment thresholds in accordance with principles of the present invention.

In contrast, the present invention controls cell size in a way that allows multiple access points or cells on the same carrier frequency to transmit simultaneously, but without reducing the transmit or output power, thereby preserving the range capability of the higher data rates. More specifically, and for example, FIG. 8 shows a graphical depiction of controlling cell size by increasing or decreasing and/or setting the start of packet threshold and/or the clear channel assessment threshold in accordance with principles of the present invention.

By changing the start of packet threshold and/or the clear channel assessment threshold rather than changing the transmit power, the range of the lower data rates is restricted without shrinking the coverage area of the higher data rates. FIG. 8 shows the results of raising the start of packet and clear channel assessment thresholds such that access points 800*a*, 800*b* 54 Megabit per second ranges 804*a*, 804*b* extend just to the edge of the desired service areas 802*a*, 802*b*, respectively. Thus, the two access points 800*a*, 800*b* can now transmit simultaneously without reduced transmit power and, consequently, not be penalized with reduced received signal strength within the desired service areas 802*a*, 802*b*.

Thus, referring once again to FIG. 1, in a wireless network 100 in accordance with principles of the present invention, access point 102*a-n* output power is not an exclusive factor in setting the service area or cell size. Rather, a combination of the output power, the start of packet threshold, and/or the clear channel assessment threshold is set to determine the service areas of access points 102*a-n*. Moreover, and in accordance with one aspect of the present invention, by fixing the start of packet and clear channel assessment thresholds relative to the output power, changing the output power does not change the service area, so long as the output power is maintained above some minimum level that prevents an inadequate received signal level at a client 104a-m within the service area.

In addition, a wireless network 100 in accordance with principles of the present invention eliminates the upper limit 506 on the achievable throughput density was described in conjunction with FIG. 5. Thus, by reducing the service area per access point while increasing access point density without degrading the signal strength at client with the wireless network 100, continuously increasing throughput density with increasing access point density is provided, along with a minimum throughput per access point.

By virtue of the foregoing, there is thus provided a system and method for a high density wireless local area network that controls cell size in a way that allows multiple cells on the same carrier frequency to transmit simultaneously, but without reducing the transmit power, thereby preserving the range capability of the higher data rates.

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. It will be understood that the present invention is applicable to any contention based open medium network. Moreover, such a network is not limited to operation in any particular frequency band; but rather, may operate at any frequency as desired. Further, the invention is not limited to operation in accordance with any standard or regulations. Therefore, the invention, in its broader aspects, is not limited to the specific details, the representative apparatus, and illustrative examples shown and described. Accordingly, departures may be made from such details without departing from the spirit or scope of the applicants' general inventive concept.

What is claimed is:

1. A method for controlling cell size associated with an access point having a receive sensitivity and an output power, comprising:
   changing by the access point at least one of a start of packet threshold and a clear channel assessment threshold to vary the cell size of the access point;
   tracking a change in output power with the start of packet and clear channel assessment threshold;
   wherein a range of a lower data rate is restricted without shrinking the coverage area of a higher data rate; and
   wherein changing the output power does not change the cell size, so long as the output power is maintained above a minimum level that prevents an inadequate received signal level at a client within the cell.

2. The method for controlling cell size associated with an access point of claim 1, wherein the output power of the access point is maintained.

3. The method for controlling cell size associated with an access point of claim 1, wherein at least one of a start of packet threshold and a clear channel assessment threshold are changed relative to the output power.

4. The method for controlling cell size associated with an access point of claim 1, further comprising raising at least one of the start of packet threshold and the clear channel assessment threshold above the minimum receive sensitivity of the access point.

5. The method for controlling cell size associated with an access point of claim 1, further comprising increasing cell size by decreasing at least one of the start of packet threshold and the clear channel assessment threshold.

6. The method for controlling cell size associated with an access point of claim 1, further comprising decreasing cell size by increasing at least one of the start of packet threshold and the clear channel assessment threshold.

7. The method for controlling cell size associated with an access point of claim 1, wherein the access point is assigned to the same carrier frequency as another access point.

8. A method for operating a high density wireless local area network, comprising:
   assigning multiple access points having receive sensitivities and output powers to the same carrier frequency;
   controlling cell sizes associated with the access points by at least one of the access points, by changing at least one of a start of packet threshold and a clear channel assessment threshold to vary the cell sizes of the access points;
   tracking changes in output powers with the start of packet and clear channel assessment thresholds;
   wherein a range of a lower data rate is restricted without shrinking the coverage area of a higher data rate; and
   wherein changing the output powers does not change the cell sizes, so long as the output powers are maintained above a minimum level that prevents an inadequate received signal level at a client within the cells.

9. The method for operating a high density wireless local area network of claim 8, wherein the output powers of the access points are maintained.

10. The method for operating a high density wireless local area network of claim 8, wherein at least one of the start of packet threshold and the clear channel assessment threshold are changed relative to the output powers.

11. The method for operating a high density wireless local area network of claim 8, further comprising raising at least one of the start of packet thresholds and the clear channel assessment thresholds above the minimum receive sensitivities of the access points.

12. The method for operating a high density wireless local area network of claim 8, further comprising increasing cell sizes by decreasing at least one of the start of packet thresholds and the clear channel assessment thresholds.

13. The method for operating a high density wireless local area network of claim 8, further comprising decreasing cell sizes by increasing at least one of the start of packet thresholds and the clear channel assessment thresholds.

14. An access point, comprising:
   a transceiver configured for engaging in wireless communications with clients, and including a transmitter having an output power and a receiver having a receive sensitivity; and
   a controller coupled to the transceiver and configured to control the operation of the transceiver when engaging in wireless communications with the clients, and including a processor configured for executing program code and a memory configured for storing the program code and at least one a start of packet threshold and a clear channel assessment threshold;
   wherein at least one of the start of packet threshold and the clear channel assessment threshold is varied to control the cell size of the access point;
   wherein a range of a lower data rate is restricted without shrinking the coverage area of a higher data rate;
   wherein the start of packet and clear channel assessment thresholds track a change in output power; and
   wherein changing the output power does not change the cell size, so long as the output power is maintained above a minimum level that prevents an inadequate received signal level at a client within the cell.

15. The access point of claim 14, wherein the output power of the transmitter is maintained.

16. The access point of claim 14, wherein at least one of a start of packet threshold and a clear channel assessment threshold are changed relative to the output power.

17. The access point of claim 14, wherein at least one of the start of packet threshold and the clear channel assessment threshold is raised above the minimum receive sensitivity of the access point.

18. The access point of claim 14, wherein the cell size is increased by decreasing at least one of the start of packet threshold and the clear channel assessment threshold.

19. The access point of claim 14, wherein the cell size is decreased by increasing at least one of the start of packet threshold and the clear channel assessment threshold.

20. The access point of claim 14, wherein the access point is assigned to the same carrier frequency as another access point.

21. A high density wireless local area network, comprising:
a first access point including a first transmitter having an output power, a first receiver having a receive sensitivity, a first processor configured for executing program code to control the operation of the first transmitter and the first receiver when engaging in wireless communications with clients, and a first memory configured for storing the program code and at least one of a start of packet threshold and a clear channel assessment threshold;
a second access point including a second transmitter having an output power, a second receiver having a receive sensitivity, a second processor configured for executing program code to control the operation of the second transmitter and the second receiver when engaging in wireless communications with clients, and a second memory configured for storing the program code and at least one of a start of packet threshold and a clear channel assessment threshold;

wherein the first and second access points are assigned the same carrier frequency; and wherein cell sizes associated with the first and second access points are controlled by changing at least one of the start of packet thresholds and the clear channel assessment thresholds to vary the cells sizes of the access points;

wherein a range of a lower data rate is restricted without shrinking the coverage area of a higher data rate;

wherein the start of packet and clear channel assessment thresholds track changes in output powers; and wherein changing the output powers does not change the cell sizes, so long as the output powers are maintained above a minimum level that prevents an inadequate received signal level at a client within the cells.

22. The high density wireless local area network of claim 21, wherein the output powers of the first and second transmitters are maintained.

23. The high density wireless local area network of claim 21, wherein at least one the start of packet thresholds and the clear channel assessment thresholds are changed relative to the output powers.

24. The high density wireless local area network of claim 21, wherein at the least one of the start of packet thresholds and clear channel assessment thresholds are raised above the minimum receive sensitivities of the first and second receivers.

25. The high density wireless local area network of claim 21, wherein the cell sizes are increased by decreasing at the least one of the start of packet thresholds and clear channel assessment thresholds.

26. The high density wireless local area network of claim 21, wherein the cell sizes are decreased by increasing at the least one of the start of packet thresholds and clear channel assessment thresholds.

* * * * *